United States Patent
Ganachaud et al.

(10) Patent No.: US 11,945,965 B2
(45) Date of Patent: Apr. 2, 2024

(54) SILICONE MATERIALS

(71) Applicants: ELKEM SILICONES France SAS, Lyons (FR); Institut National des Sciences Appliquées LYON, Villeurbanne (FR); Universite Claude Bernard Lyon 1, Villeurbanne (FR); Centre national de la recherche scientifique, Paris (FR); UNIVERSITE JEAN MONNET SAINT ETIENNE, Saint-Etienne (FR)

(72) Inventors: François Ganachaud, Decines (FR); Daniel Portinha De Almeida, Fontaines sur Saone (FR); Etienne Fleury, Soucieu en Jarrest (FR); Gabriel Duaux, Villiers-Vineux (FR); Aymeric Genest, Oullins (FR); Emmanuel Pouget, Lyons (FR)

(73) Assignees: ELKEM SILICONES FRANCE SAS, Lyons (FR); INSTITUT NATIONAL DES SCIENCES APPLIQUÉES LYON, Villeurbanne (FR); UNIVERSITÉ CLAUDE BERNARD LYON 1, Villeurbanne (FR); CENTRE NATIONAL DE LA RECHERCHE SCIENTIFIQUE, Paris (FR); UNIVERSITE JEAN MONNET SAINT ETIENNE, Saint-Etienne (FR)

( * ) Notice: Subject to any disclaimer, the term of this patent is extended or adjusted under 35 U.S.C. 154(b) by 836 days.

(21) Appl. No.: 16/971,059

(22) PCT Filed: Feb. 27, 2019

(86) PCT No.: PCT/EP2019/054893
§ 371 (c)(1),
(2) Date: Aug. 19, 2020

(87) PCT Pub. No.: WO2019/166507
PCT Pub. Date: Sep. 6, 2019

(65) Prior Publication Data
US 2021/0071033 A1     Mar. 11, 2021

(30) Foreign Application Priority Data

Feb. 28, 2018   (FR) ...................................... 1851779

(51) Int. Cl.
C09D 183/08    (2006.01)
B05D 1/00      (2006.01)
B33Y 70/00     (2020.01)
C08K 3/36      (2006.01)
C08L 83/08     (2006.01)

(52) U.S. Cl.
CPC ............. *C09D 183/08* (2013.01); *B05D 1/00* (2013.01); *B33Y 70/00* (2014.12); *C08K 3/36* (2013.01); *C08L 83/08* (2013.01)

(58) Field of Classification Search
CPC ......... C08G 77/26; C08G 77/18; C08L 83/08; C09D 183/08
See application file for complete search history.

(56) References Cited

U.S. PATENT DOCUMENTS

| | | |
|---|---|---|
| 4,915,938 A | 4/1990 | Zawadzki |
| 6,124,490 A | 9/2000 | Gormley et al. |
| 10,358,541 B2 | 7/2019 | Ganachaud et al. |
| 2016/0213597 A1* | 7/2016 | Oh ........................ C11D 3/2075 |
| 2018/0265668 A1* | 9/2018 | Ganachaud .............. C08K 5/09 |
| 2019/0249036 A1* | 8/2019 | Pibre .................... C09D 183/08 |

FOREIGN PATENT DOCUMENTS

| | | |
|---|---|---|
| CN | 105111470 A | 12/2015 |
| EP | 028357 B2 * | 9/1983 |
| JP | 2-502285 | 7/1990 |
| JP | 2020-545719 | 9/2020 |
| JP | 2021-517918 | 7/2021 |
| WO | WO 2006/137577 A2 * | 12/2006 |

OTHER PUBLICATIONS

Preliminary Report on Patentability dated Oct. 24, 2018 in French Application No. 1851779.
"Silicones" Apr. 15, 2003, Encyclopedia of Polymer Science and Techno, Wiley, US, pp. 765-841, XP007918236.
Hang, Lu, et al, "Superamolecular Silicone Elastomers with Healable and Hydrophobic Properties Crosslinked by Salt-Forming Vulcanization", Mar. 1, 2017, vol. 55, No. 5, pp. 903-911, Journal of Polymer Science, Part A: Polymer Chemistry, XP055518457.
International Search Report dated Mar. 23, 2019 in International Application No. PCT/EP2019/054893.

\* cited by examiner

*Primary Examiner* — Marc S Zimmer
(74) *Attorney, Agent, or Firm* — B. Aaron Schulman, Esq.; Stites & Harbison, PLLC

(57) ABSTRACT

Silicone material obtained by a reaction between:—at least one organopolysiloxane (A) that has a molar mass of less than 70,000 g/mol, preferably less than 50,000 g/mol, and contains siloxyl units I.1 and I.2; and—at least one organic compound (B) carrying at least two carboxylic acid groups and having no unsaturation.

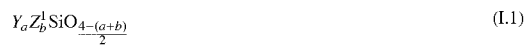

(I.1)

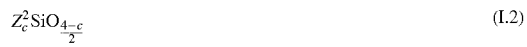

(I.2)

16 Claims, No Drawings

SILICONE MATERIALS

The present invention relates to silicone materials, the preparation method and uses thereof.

Several routes have been described for the formation of supramolecular silicone materials based on ionic interactions. In one first route, a polyorganosiloxane is used comprising amino groups with an unsaturated acid compound (WO2016102498). The material obtained has good elastic properties but low yield strength. A second route (Feng et al. Journal of Polymer Science, Part A: Polymer chemistry 2017, 55, 903-911) places a polyorganosiloxane carrying amino groups in contact with a multifunctional acid. The material obtained is hard but brittle and has neither elastic nor mechanical properties.

It would therefore be of advantage to provide a silicone material having both good mechanical and elastic properties. Said material could have various uses. It would also be of advantage to provide said material that is self-healing and able to be recycled with simple, low-cost methods.

It is therefore one objective of the present invention to provide a silicone material having good elastic and mechanical properties.

A further objective of the present invention is to provide said material having healing properties.

A further objective of the present invention is to provide said material that is able to be recycled with simple, low-cost methods.

A further objective of the invention is also to provide a method for preparing said material. Other objectives will become apparent on reading the following invention.

These objectives are reached with the present invention which concerns a silicone material obtained via reaction between:
- at least one organopolysiloxane A of molar mass less than 70000 g/mol, preferably less than 50000 g/mol, and contains siloxyl units (I.1) and (I.2)

$$Y_a Z^1_b SiO_{\frac{4-(a+b)}{2}}; \quad (I.1)$$

$$Z^2_c SiO_{\frac{4-c}{2}} \quad (I.2)$$

where:
a=1 or 2,
b=0, 1 or 2,
a+b=1, 2 or 3,
c=0, 1, 2 or 3,
the symbols Y, the same or different, represent a functional group of formula (I.3):

$$-E-(NH-G)_h-(NH_2)_i \quad (I.3)$$

where:
h=0 or 1,
i=0 or 1,
h+i=1 or 2,
E is an aliphatic, cycloaliphatic or aromatic divalent hydrocarbon radical having 1 to 30 carbon atoms; preferably aliphatic having 1 to 10 carbon atoms;
if present, G is an aliphatic hydrocarbon radical having 1 to 10 carbon atoms, monovalent when i=0 or divalent when i=1;
$Z^1$, the same or different, is a monovalent hydrocarbon radical having 1 to 30 carbon atoms and optionally comprising one or more unsaturations and/or one or more fluorine atoms or a hydroxyl group, preferably $Z^1$ is a monovalent hydrocarbon group selected from the group composed of alkyl groups having 1 to 8 carbon atoms, alkenyl groups having 2 to 6 carbon atoms and aryl groups having 6 to 12 carbon atoms optionally comprising one or more fluorine atoms, and more preferably $Z^1$ is selected from the group composed of methyl, ethyl, propyl, 3,3,3-trifluoropropyl, vinyl, xylyl, tolyl and phenyl groups;

$Z^2$, the same or different, is a monovalent hydrocarbon radical having 1 to 30 carbon atoms and optionally comprising one or more unsaturations and/or one or more fluorine atoms, a hydroxyl group, or radical —OR' where $R^1$ is a linear or branched $C_1$-$C_{10}$ hydrocarbon radical, and preferably $Z^2$ is a monovalent hydrocarbon group selected from the group composed of alkyl groups having 1 to 8 carbon atoms, alkenyl groups having 2 to 6 carbon atoms and aryl groups having 6 to 12 carbon atoms optionally comprising one or more fluorine atoms, or —$OR^1$ radical where $R^1$ is a linear or branched $C_1$-$C_{10}$ hydrocarbon radical, and more preferably $Z^2$ is selected from the group composed of methyl, ethyl, propyl, 3,3,3-trifluoropropyl, vinyl, ethoxyl, methoxyl, xylyl, tolyl and phenyl groups; said organopolysiloxane A comprising per molecule:
- at least one siloxyl unit (I.1) carrying at least one functional group of formula (I.3),
- two units (I.2) in which $Z^2$ is a radical —$OR^1$; and
- at least two terminal units M selected from the group composed of siloxyl units $Y_3SiO_{1/2}$, $YZ^1_2SiO_{1/2}$, $Y_2Z^1SiO_{1/2}$ and $Z^2_3SiO_{1/2}$; and
- at least one organic compound B carrying at least two carboxylic acid groups and having no unsaturation.

Preferably, the reaction is conducted at a temperature of between 30 and 200° C., preferably between 50 and 150° C., more preferably between 40 and 100° C., further preferably between 50 and 70° C. The reaction time and temperature are dependent on the type of reagents and temperature. Persons skilled in the art are able to adjust temperature conditions and heating time to obtain materials having good mechanical and self-healing properties. By way of indication, the reaction time and temperature can vary between a few hours at 100° C. and a few days at 70° C.

In the present invention, by unsaturation in a compound it is meant a double or triple bond between two carbon atoms. Compounds not having an unsaturation i.e. not comprising double or triple C—C bonds, therefore only comprise single carbon-carbon bonds. Said compounds are also called saturated compounds. Therefore, compound B is a saturated organic compound comprising at least two carboxylic acid functions.

In the present invention, the silicone material is a supramolecular silicone material and is advantageously in the form of an ionic supramolecular network. The reaction between the amine functions of organopolysiloxane A and the carboxylic acid functions of compound B is an acid-base reaction involving ionic interactions. This supramolecular silicone material or ionic supramolecular network can be an elastomer for example.

In the present application, the molar mass is a mean molar mass (Mn). The value of Mn can be determined by $^{29}$Si NMR or size exclusion analysis.

Preferably, the organopolysiloxanes A can have a linear or branched structure with units M, D, T Q used in silicone nomenclature and corresponding to:
M=siloxyl unit of formula $(R)_3SiO_{1/2}$
D=siloxyl unit of formula $(R)_2SiO_{2/2}$
T=siloxyl unit of formula $(R)SiO_{3/2}$ et
Q=siloxyl unit of formula $SiO_{4/2}$ where the R groups, the same or different, are monovalent hydrocarbon groups having 1 to 30 carbon atoms.

If the organopolysiloxanes are linear, they are essentially composed of siloxyl units D, selected in particular from the group composed of $Y_2SiO_{2/2}$, $YZ^1SiO_{2/2}$ and $Z^2_2SiO_{2/2}$ siloxyl units and terminal siloxyl units M selected in particular from the group composed of $Y_3SiO_{1/2}$, $YZ^1_2SiO_{1/2}$, $Y_2Z^1SiO_{1/2}$ and $Z^2_3SiO_{1/2}$ siloxyl units, Y, $Z^1$ and $Z^2$ being such as defined above.

In one particularly preferred embodiment, the organopolysiloxanes A are selected from among linear organopolysiloxanes comprising siloxyl units (I.1) and (I.2) of following formulas:

 (I.1)

 (I.2)

where:
Y and $Z^1$ and $Z^2$ have the definitions given above;
a=1 or 2, b=0, 1 or 2 and a+b=2 or 3
c=2 or 3.

In particularly preferred manner, the organopolysiloxanes A are selected from among linear organopolysiloxanes comprising units (I.1) selected from the group composed of $YZ^1SiO_{2/2}$ and $YZ^1_2SiO_{1/2}$, and units (I.2) selected from the group composed of $Z^2_2SiO_{2/2}$ and $Z^2_3SiO_{1/2}$, Y, $Z^1$ and $Z^2$ being such as defined above.

Preferably, the organopolysiloxanes A per molecule comprise at least one siloxyl unit (I.1) carrying at least one functional group of formula (I.3) and two units (I.2) for which one, and only one, of $Z^2$ is a radical —$OR^1$. Preferably, it is to be understood that the organopolysiloxanes A per molecule comprise at least one siloxyl unit (I.1) carrying at least one functional group of formula (I.3) and two units (I.2) for each of which one, and only one, of $Z^2$ represents a radical —$OR^1$.

In one particular embodiment, the organopolysiloxane A comprises two terminal units M of formula $Z^2_3SiO_{1/2}$ in each of which one, and only one, of $Z^2$ represents a radical —$OR^1$.

Preferably, in formula (I.1) of the invention a=1 and b=1 or 2.

Preferably, the organopolysiloxanes A of the invention comprise at least two units (I.1) each carrying at least one group (I.3), preferably each carrying a single unit (I.3).

Preferably, the organopolysiloxanes A of the invention comprise:
at least two units (I.1) each carrying at least one group (I.3), preferably each carrying a single unit (I.3); and
two units (I.2) for which one $Z^2$ represents a radical —$OR^1$.

Preferably, the organopolysiloxanes A of the invention comprise:
at least two units (I.1) each carrying at least one group (I.3), preferably each carrying a single unit (I.3); and
two units (I.2) in each of which one, and only one, of $Z^2$ is a radical —$OR^1$.

Preferably, the organopolysiloxanes A of the invention comprise:
at least two units (I.1) each carrying at least one group (I.3), preferably each carrying a single unit (I.3); and
two terminal units M of formula $Z^2_3SiO_{1/2}$ in each of one, and only one, of $Z^2$ is a radical —$OR^1$.

Preferably, it is to be understood that the organopolysiloxanes A of the invention only comprise two radicals —$OR^1$ which are preferably carried by terminal units M.

Preferably, the organopolysiloxanes A comprise a number of siloxyl units (I.1) of between 1 and 60, preferably between 1 and 20, more preferably between 1 and 10.

Preferably, the organopolysiloxanes A comprise a number of siloxyl units (I.2) of between 50 and 950, preferably 50 and 500, more preferably between 100 and 375.

Preferably, the organopolysiloxanes A comprise an amount of NH bonding expressed in mol per gram of between $1 \cdot 10^{-5}$ and $10 \cdot 10^{-2}$ mol/g, more preferably $5 \cdot 10^{-5}$ $5 \cdot 10^{-2}$ mol/g, further preferably $1 \cdot 10^{-4}$ to $5 \cdot 10^{-3}$ mol/g. By amine function, it is meant to designate primary or secondary amines. It is therefore to be understood that one mole of primary amine function contains two moles of N—H bonds, and that one mole of secondary amine function contains one mole of N—H bonds.

Compounds A of the invention are particularly selected from among the following compounds:

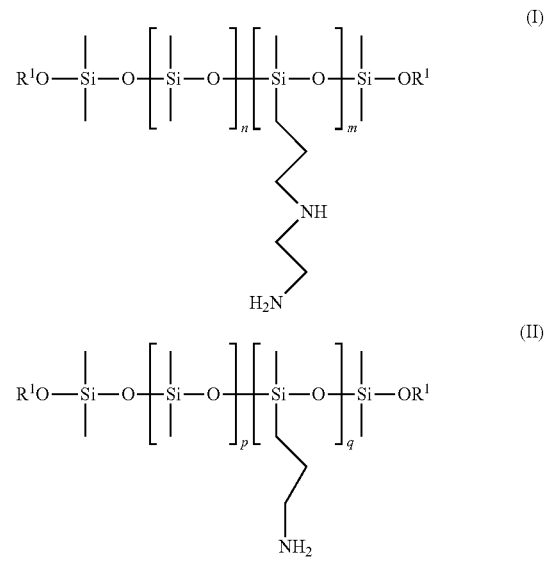

with n or p=50 to 950, preferably 50 to 500, preferably 100 to 375; and
m or q=1 to 60, preferably 1 to 20, preferably 1 to 10.

In the invention, compound B can be selected from the group composed of the following acids: citric acid, malic acid, succinic acid, oxalic acid, malonic acid, succinic acid, tartaric acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid, phthalic acid, isophthalic acid, terephthalic acid, dipicolinic acid, trimesic acid, isocitric acid, oxalosuccinic acid, tricarballylic acid, homocitric acid, hydroxycitric acid and pamoic acid.

Preferably, compound B is selected from the group composed of the following acids: citric acid, malic acid and succinic acid. In one more preferred embodiment, compound B is citric acid.

The ratio J can also be defined representing the ratio between the number of moles of acid functions of compound B and the number of moles of amine functions of organopolysiloxane A. Ratio J corresponds to the following relationship:

$$J = \frac{\text{number of moles of compound }(B) \times \text{number of acid functions of compound }(B)}{\text{number of moles of compound }(A) \times \text{number of amine functions of compound }(A)}$$

Preferably, ratio J is between 0.5 and 1.5, more preferably between 0.8 and 1.2, further preferably between 0.85 and 1.

Preferably, organopolysiloxane A has dynamic viscosity measured at 25° C. with a stress control rheometer, in particular TA-DHRII, of less than 30000 mPa·s, preferably between 1 and 15000 mPa·s, more preferably between 1 and 10000 mPa·s and further preferably between 1 and 8000 mPa·s.

In one particular embodiment, the silicone material of the invention has good mechanical properties whilst maintaining good hardness despite the absence of fillers generally used in these types of compounds to reinforce mechanical properties. In the absence of fillers, the supramolecular silicone material of the invention can display elongation greater than 100% and a modulus higher than 0.25 MPa.

The silicone material of the invention may comprise fillers, in particular reinforcing or non-reinforcing fillers. Reinforcing fillers will advantageously allow improved mechanical properties of the silicone materials of the invention.

In the present invention, the fillers are preferably mineral. In particular they can be siliceous. Reinforcing siliceous fillers are selected from among precipitated or pyrogenic silicas or mixtures thereof. The mean particle size of these powders is generally less than 0.1 μm (micrometres) and the BET specific surface area is greater than 30 m$^2$/g, preferably between 30 and 500 m$^2$/g. Semi-reinforcing siliceous fillers such as diatomaceous earth or ground quartz can also be employed. With regard to non-siliceous mineral materials, these can be used as semi-reinforcing filler or packing. Examples of these non-siliceous fillers that can be used alone or in a mixture are carbon black, titanium dioxide, aluminium oxide, hydrated alumina or aluminium trihydroxide, expanded vermiculite, non-expanded vermiculite, calcium carbonate optionally surface-treated by fatty acids, zinc oxide, mica, talc, iron oxide, kaolin, barium sulfate and slaked lime. The particle size of these fillers is generally between 0.001 and 300 μm (micrometres) and the BET surface area is smaller than 100 m$^2$/g. In practice but not limited thereto, the fillers employed can be a mixture of quartz and silica. The fillers can be treated with any suitable product.

Preferably, the material of the invention comprises fillers selected from among a quartz, silica in particular precipitated or pyrogenic silica, and calcium carbonate, alone or in a mixture.

In particularly advantageous manner, in particular due to the low viscosity of organopolysiloxanes A, it is possible to add to the material of the invention up to at least 60 weight % of fillers without impairing the structuring of the ionic network. The addition of these fillers particularly affords improved hardness and yield strength of the materials of the invention.

Therefore, the material of the present invention may comprise from 0.5 to 70 weight % of fillers, preferably 1 to 60 weight % of filler relative to the weight of organopolysiloxane A. The amount of filler in the material of the invention can vary as a function of type of filler. Those skilled in the art are able to adapt the amount of filler as a function of filler type and desired properties.

Therefore, the silicone material of the invention may comprise:
  from 0.5 to 20 weight %, preferably 1 to 15 weight %, of silica, in particular precipitated silica or pyrogenic silica, relative to the weight of organopolysiloxane A, and/or
  from 0.5 to 60 weight %, for example 3 to 60 weight % of quartz relative to the weight of organopolysiloxane A, and/or
  from 0.5 to 50 weight %, for example 3 to 50 weight %, of calcium carbonate relative to the weight of organopolysiloxane A.

The silicone material of the invention may further comprise:
  one or more other linear organopolysiloxanes (oils) or branched organopolysiloxanes (resins) selected from among non-functionalised organopolysiloxanes e.g. polydimethylsiloxanes, and functionalised organopolysiloxanes e.g. polydimethylsiloxanes comprising, carrying hydroxyl, alkoxyl, alkenyl groups, or sterically hindered piperidinyl groups such as described in application EP 1758541;
  a crosslinking agent e.g. an organosilane or organopolysiloxane having three silicon-bonded hydrolysable groups per molecule;
  a polycondensation catalyst selected from among tin, zinc, chromium, cobalt, nickel, titanium, aluminium, gallium, germanium or zirconium metal compounds, or organic compounds such as carbenes, amines, aminidines or guanidines.
  one or more functional additives selected in particular from among:
    adhesion promoters or modulators;
    additives to increase consistency;
    pigments;
    heat-resistant, oil-resistant, fire-resistant additives; or
  a mixture of two or more of these elements.

Particularly advantageously, the silicone material of the invention is a dynamic material i.e. having self-healing properties. The self-healing of the materials of the invention can be obtained by heating the material to a temperature of between 50 and 130° C. for 1 to 10 h. For example, by heating the material to 70° C. for 48 hours.

Particularly advantageously, the supramolecular silicone material of the invention can also be recycled. The inventors have shown that the materials of the invention lose their mechanical properties when immersed in hot water, in particular at a temperature of between 70 and 100° C. fora long period of time, in particular for 24 h to 167 h.

The supramolecular silicone material of the invention is obtained by reaction between at least one organopolysiloxane A and at least one compound B. The method for preparing the supramolecular silicone material preferably comprises the following steps:
  a) placing organopolysiloxane A in a vessel;
  b) if compound B is in solid form, it is dissolved in an organic solvent S;
  c) mixing compounds A and B or A and B and S;
  d) heating the mixture obtained, preferably to a temperature of between 30 and 200° C., preferably between 50 and 150° C., more preferably between 40 and 100° C., further preferably between 50 and 70° C.

The reaction time under heat is dependent on the type of reagents and temperature. Persons skilled in the art are able to adjust temperature conditions and heating time to obtain materials having good mechanical and self-healing properties. By way of indication, the reaction time under heat can vary from a few hours at 100° C. to a few days at 70° C.

After step c), it is possible to shape the composition obtained in different manners, for example in a thin layer, in a mould or directly in a container. Step d) will set up the ionic network and generate the silicone material of the invention.

In a first embodiment, the organic solvent S can be selected in particular from among polar organic solvents, particularly alcohols e.g. ethanol, or ethers e.g. ethyl acetate, or a mixture of these solvents.

The amount of organic solvent S used is small. Preferably, the amount of solvent S used in the method of the invention is less than 30 weight % relative to the total weight of the mixture A+B+S, more preferably less than 20%, and further preferably less than 10%.

If the silicone material of the invention comprises fillers, these can be added either directly mixed with organopolysiloxane A, or to the reaction medium after mixing organopolysiloxane A and compound B.

The organopolysiloxane A of the invention can be used pure (since it has a molar mass of less than 70000 g/mol), in solution in an organic solvent for example S, or in an emulsion.

In another embodiment, the method of the invention is an emulsion method in which the organopolysiloxane A is an emulsion in water. In this case, the emulsion also comprises one or more surfactants or stabilisers, and compound B is solubilised in water. This emulsion can also contain other agents such as biocides, anti-gelling additives and/or defoaming agents.

Therefore, the present invention further concerns silicone materials such as described above and comprising less than 50 weight % of organic solvent S, preferably less than 40 weight %, more preferably less than 30 weight % and in particular less than 20 weight %, further preferably less than 10 weight %, for example less than 5 weight % relative to the total weight of the silicone material.

Preference is given to transparent materials that are uncoloured or only slightly coloured.

The silicone materials of the invention can be used in particular for coating flexible substrates. Flexible substrates are selected in particular from among textiles, paper and polymer films. Uses for textile coating include for example the production of airbags, conveyor belts, etc. Uses for paper and polymer film coating include the production of non-stick coatings. Another application using the coating of polymer films or textiles concerns the production of dressings. The invention therefore also covers a method for coating flexible substrates comprising the use of the material of the invention.

The silicone materials of the invention can also be used for 3D printing. The present invention also concerns the use of the silicone materials of the invention to prepare items in silicone elastomer applying additive manufacturing processes also known as «3D printing» processes. According to standard ASTM F2792-12a: «Standard terminology for additive manufacturing technologies», a «3D printer D is defined as «a machine used for 3D printing» and «3D printing» is defined as «the manufacture of objects via deposit of a material using a print head, nozzle or other printer technology».

Additive manufacturing «AM» is defined as a process for joining materials to produce objects from 3D model data, generally layer by layer, as opposed to subtractive manufacturing processes. The synonyms associated with 3D printing and encompassed by 3D printing comprise additive manufacturing, additive processes, additive techniques and additive layer manufacturing. Additive manufacturing (AM) can also be called rapid prototyping (RP). Such as used herein, "3D printing" is interchangeable with "additive manufacturing" and vice versa.

Advantageously, the silicone materials of the invention can be used for 3D printing processes using material extrusion or material deposit. Material extrusion is an additive manufacturing process whereby a filament of material is extruded and selectively dispensed through a nozzle. The flow rate of extruded material can be controlled inter alia via the pressure applied to the nozzle or via temperature.

Material deposit is an additive manufacturing process whereby fine droplets of a material are selectively deposited by print heads similar to those of paper printers. This process is also known as inkjet.

The present invention therefore also covers a 3D printing process comprising the use of a compound of the invention.

The silicone materials of the invention can also be used for damp-proofing wood, concrete or stone. The present invention therefore also covers a damp-proofing method of wood, concrete or stone comprising the use of a compound of the invention.

EXAMPLES

In the examples below, given for illustrative purposes, reference is made to the following definitions:

Dynamic Viscosity

The dynamic viscosity of the products was measured with a stress control rheometer (TA-DHRII). Measurements were taken in flow mode with Cone-Plate geometry of diameter 40 mm and truncation value of 52 μm. Viscosity was recorded as a function of shear rate (0.01-100 s$^{-1}$) at 25° C.

Rheology

Rheological analyses were conducted with a stress control rheometer (TA-DHRII) at 25° C. using Plate/Plate geometry (diameter of 40 mm). Frequency scans were recorded in the linear viscoelastic domain of the products between 100 and 0.01 Hz.

Tensile Tests

Tensile tests to determine modulus at 100% strain, yield strength and elongation at break were conducted with a uniaxial tensile testing machine MTS 2/M (10KN). The maximum load of the load cell was 100N. A self-tightening jaw was used for the lower part and pneumatic jaw for the upper part. Test specimens were of H3 type. An extensometer was used to measure elongation. The initial gap was 10 mm.

Shore 00 hardness and Shore A hardness were measured with durometers on silicone material thickness of 6.5 mm.

The organopolysiloxane compounds A used in the examples and detailed in the table below meet one of the following formulas PDMS A01 (Comparative)

Linear organopolysiloxanes having 3-aminopropyl-dimethylsilyloxy terminal units and dimethylsilyloxy units D of formula (I) below:

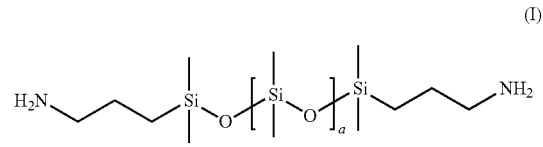

(I)

PDMS A11-A12-A13 (Comparative)

Linear organopolysiloxanes having trimethylsiloxy terminal units, dimethylsiloxy units D and units D comprising a methyl substituent and aminopropyl or aminoethyl-aminopropyl amino unit corresponding to formulas (II) and (III) below:

PDMS A21-A22-A23 (Organopolysiloxane A of the Invention)

Linear organopolysiloxanes having methoxydimethylsiloxy terminal units, dimethylsiloxy units and units D comprising a methyl substituent and aminoethyl-aminopropyl amino unit corresponding to formula (IV) below:

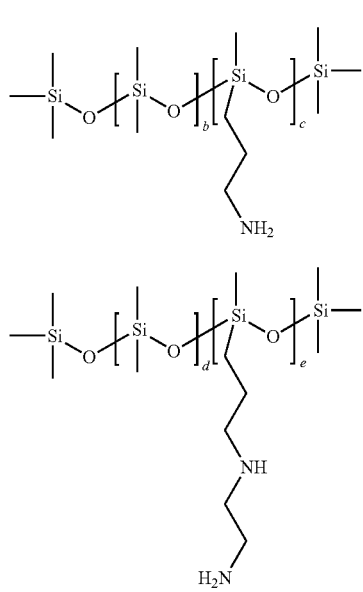

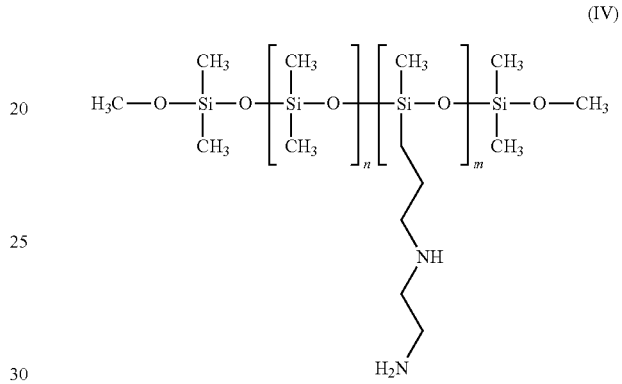

TABLE 1

| Organopolysiloxane A | Amino unit structure | Nb. amino units | Nb. of D units | Amine function content (mol/g) | Viscosity (mPa · s) | Molar mass (g/mol) |
|---|---|---|---|---|---|---|
| A01 | aminopropyl | 2 | 37 | 6.714E−04 | 50 | 3000 |
| A11 | aminopropyl | 4-5 | 46-59 | 8.500E−04 | 80-200 | 4000-5000 |
| A12 | aminopropyl | 42-45 | 602 | 8.571E−04 | 1800-2000 | 50000 |
| A13 | aminoethylaminopropyl | 4 | 365 | 2.571E−04 | 4500 | 28000 |
| A21 | aminoethylaminopropyl | 2 | 135 | 3.000E−04 | 300 | 10000 |
| A22 | aminoethylaminopropyl | 2 | 135 | 3.500E−04 | 300 | 10000 |
| A23 | aminoethylaminopropyl | 2 | 270 | 1.643E−04 | 1000 | 20000 |

D = dimethylsilyloxy unit

A comparative example was also prepared from a PDMS A31 (Comparative organopolysiloxane A):

PDMS A31 (Comparative Organopolysiloxane A)

Branched organopolysiloxanes of general formula (V) below comprising methoxydimethylsiloxy terminal units, and D and T units of which some comprising an aminoethyl-aminopropyl amino unit.

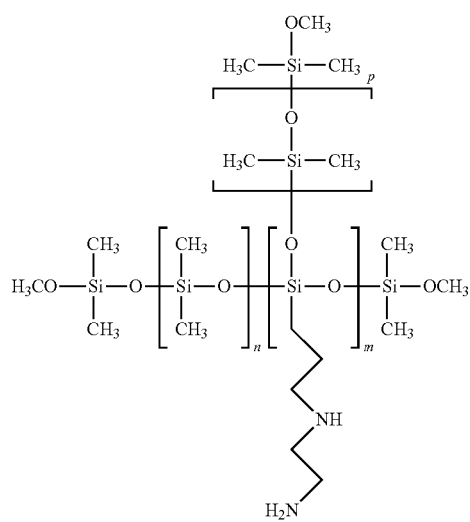

(V)

This organopolysiloxane comprises more than two alkoxy functions.

TABLE 2

| Organopolysiloxane Comparative A | Amino unit structure | Nb. amino units | Nb. D units | Amine function content (mol/g) | Viscosity (mPa · s) | Molar mass (g/mol) |
| --- | --- | --- | --- | --- | --- | --- |
| A31 | aminoethylaminopropyl | 2 | 220-320 | 1.571E−04 | 1500 | 15000-25000 |

General Method for Preparing Silicone Materials

In the following examples, the materials were prepared as follows:
- the acid was solubilised in 60% ethanol and 40% ethyl acetate mixture. The concentration of the acid in the solvent being approximately was 1.5 mol/l.
- The amino organopolysiloxane was placed in a vessel and cooled to about −20° C. The acid solubilised in the solvent mixture was added such as to obtain the ratio of functions J described in the table.
- The reaction mixture was homogenized using a planetary mixer for one minute at about 2500 rpm.
- After homogenization, the reaction mixture was poured into a Petri dish or onto a Teflon-coated plate and placed in an oven at 70° C. for 6 days.
- The supramolecular material obtained was formed into film of 1 mm thickness under pressure at between 50 and 70° C. for 4 to 48 h.
- H3 test specimens were prepared.

To obtain the materials of the invention, a composition is used having a ratio J=1 comprising about 93 weight % of organopolysiloxane A, 2 weight % of compound B and 5 weight % of solvent.

Results of the Mechanical Properties of the Materials of the Invention Obtained with J=1

TABLE 3

| | Example 1 |
| --- | --- |
| Organopolysiloxane A | A23 |
| Compound B | Citric acid |
| J function ratio | 1 |
| Yield strength (MPa) | 0.4 |
| Elongation at break (%) | 350 |
| Shore hardness 00 | 55 |
| Appearance | Smooth and transparent |

This result shows that the material of the invention has good mechanical properties and high hardness. In addition, the material obtained is smooth and transparent.

Comparison with Materials Obtained with Acrylic Acid

The method of the invention was implemented so that J=1 with citric acid (material of the invention) and with acrylic acid (comparative material).

TABLE 4

| | Organopolysiloxane A | Acid B | Function ratio J | Yield strength (MPa) |
| --- | --- | --- | --- | --- |
| Comparative 1 | A23 | acrylic acid | 1 | 0.21 ± 0.02 |
| Example 2 | A23 | citric acid | 1 | 0.46 ± 0.04 |

These results show that the materials of the invention (citric acid) have yield strength that is twice higher than the materials obtained with acrylic acid.

Comparison Between Materials of the Invention and Materials Obtained with Organopolysiloxanes not Comprising an Alkoxy Unit, the Acid being Citric Acid.

TABLE 5

| | Organopolysiloxane A | Acid B | J | Colour | Appearance |
| --- | --- | --- | --- | --- | --- |
| Comparative 2 | A01 | Citric | 1 | Transparent, colourless | Viscous liquid |
| Comparative 3 | A11 | Citric | 1 | Transparent, colourless | Highly viscous, sticky |
| Comparative 4 | A12 | Citric | 1 | Transparent, slightly yellow | Highly viscous, malleable (plasticine) |
| Comparative 5 | A13 | Citric | 1 | Transparent, colourless | Hard (++) but brittle |
| Example 3 | A21 | Citric | 1 | Transparent, | Elastomer (elastic+) |
| Example 4 | A22 | Citric | 1 | Transparent, colourless | Elastomer (elastic+) |
| Example 5 | A23 | Citric | 1 | Transparent, colourless | Elastomer (elastic++) |

(n.m. = non-measurable)

These results show that a material of medium viscosity without terminal alkoxy function does not have any mechanical properties. This material behaves as a brittle solid, or sticky gel. Additionally, when viscosity decreases, the material behaves as a viscous liquid when there are no terminal alkoxy functions.

On the contrary, the materials of the invention have good mechanical properties.

Comparison Between Materials of the Invention and Materials Obtained with Organopolysiloxanes Comprising More than Two Alkoxy Units, the Acid being Citric Acid.

TABLE 6

|  | Organo-polysiloxane A | Acid B | J | Colour | Appearance |
| --- | --- | --- | --- | --- | --- |
| Comparative 6 | A31 | Citric | 1 | Transparent, colourless | Elastomer (elastic−) |
| Example 3 | A21 | Citric | 1 | Transparent, | Elastomer (elastic+) |
| Example 4 | A22 | Citric | 1 | Transparent, colourless | Elastomer (elastic+) |
| Example 5 | A23 | Citric | 1 | Transparent, colourless | Elastomer (elastic++) |

The presence of more than two alkoxy groups leads to the formation of a less elastomeric material.

Change in Mechanical Properties as a Function of J

For these tests, the organopolysiloxane A used was A23 and acid B was citric acid.

TABLE 7

|  | Example 6 | Example 7 | Example 8 | Example 9 |
| --- | --- | --- | --- | --- |
| J | 1 | 0.95 | 0.9 | 0.85 |
| Modulus at 100% strain | 0.17 ± 0.01 | 0.23 ± 0.01 | 0.24 ± 0.01 | 0.21 ± 0.01 |
| Yield strength (MPa) | 0.40 ± 0.03 | 0.50 ± 0.01 | 0.44 ± 0.02 | 0.50 ± 0.09 |
| Elongation at break (%) | 350 ± 40 | 390 ± 20 | 300 ± 30 | 400 ± 60 |
| Shore 00 hardness (±2) | 55 | 60 | 61 | 57 |
| Appearance | Smooth transparent | Smooth transparent | Smooth transparent | Smooth transparent |

These results show that mechanical properties remain satisfactory for different values of J.

Effect of Type of Acids on Mechanical Properties

All tests were performed with J=1.

TABLE 8

|  | Organopolysiloxane A | Acid B | Shore hardn. 00 (±2) | Modulus at 100% strain (MPa) | Yield strength (MPa) | Elongation at break (MPa) | Appearance |
| --- | --- | --- | --- | --- | --- | --- | --- |
| Example 6 |  | Citric | 55 | 0.17 ± 0.01 | 0.40 ± 0.03 | 350 ± 40 | Smooth transparent |
| Example 10 | A23 | Malic | 53 | 0.15 | 0.24 | 200 | Smooth transparent |
| Example 11 |  | Succinic | 58 | nm | nm | nm | Smooth transparent |
| Example 12 |  | Citric | 59 | nm | nm | nm | Smooth transparent |
| Example 13 | A22 | Malic | 63 | 0.24 | 0.24 | 100 | Smooth transparent |
| Example 14 |  | Succinic | 69 | nm | nm | nm | transparent smooth |

(nm = not measured)

By modifying the structure of compound B, it is also possible to modulate the mechanical properties of the ionic material.

Comparison Between Materials of the Invention and Materials Obtained with Organopolysiloxanes Comprising More than Two Alkoxy Units, the Acid being Citric Acid.

TABLE 9

|  | Organo-polysiloxane A | Acid B | Elongation at break (MPa) |
|---|---|---|---|
| Example 6 | A23 | Citric | 350 ± 40 |
| Comparative 6 | A31 | Citric | 250 |

The presence of more than two alkoxy groups leads to the formation of less elastomeric material having lower elongation at break.

Effect of Adding Fillers

It is possible to incorporate fillers in the materials of the invention.

Tests were conducted by incorporating fillers in the materials of the invention. The incorporation of different fillers (silica, quartz, calcium carbonate) does not perturb the structuring of the physical network. After incorporation, the material is an elastomer with improved hardness.

Additionally, it is possible to add up to 60 weight % of fillers relative to organopolysiloxane A without impairing the structuring of the ionic network. The addition of fillers chiefly improves hardness and yield strength.

Addition of Precipitated Silica: Tixosil 365®

The results are given below for materials obtained with ratios J=1.

TABLE 10

|  | Example 6 | Example 15 |
|---|---|---|
| Acid B | Citric | Citric |
| Organopolysiloxane A | A23 | A23 |
| Tixosil 365 ® filler (wt. % of A) | 0 | 10 |
| Modulus at 100% strain (MPa) | 0.17 | 0.37 |
| Yield strength (MPa) | 0.40 | 1 |
| Elongation at break (%) | 350 | 340 |

Addition of Quartz

The results are given below for materials obtained via reaction between organopolysiloxane A23 and citric acid with ratio of J=1.

TABLE 11

|  | Example 6 | Example 16 | Example 17 | Example 18 | Example 19 | Example 20 | Example 21 |
|---|---|---|---|---|---|---|---|
| Quartz (wt. % relative to A23) | 0 | 10 | 20 | 30 | 40 | 50 | 60 |
| Modulus at 100% strain (MPa) | 0.17 | 0.28 | 0.37 | 0.23 | 0.26 | 0.29 | 0.33 |
| Yield strength (Mpa) | 0.40 | 0.68 | 0.95 | 0.8 | 0.9 | 0.9 | 1 |
| Elongation at break (%) | 350 | 220 | 310 | 500 | 540 | 500 | 400 |
| Shore 00 hrd. (±2) | 55 | 64 | 66 | 62 | 67 | 69 | 70 |
| Appearance of material | Smooth & transparent | Smooth Opaque white | Smooth Opaque white | Smooth Opaque white | Smooth Opaque white | Smooth Opaque white | Smooth Opaque white |

Addition of Calcium Carbonate $CaCO_3$

The results are given below for materials obtained via reaction between organopolysiloxane A23 and citric acid with ratio of J=1.

TABLE 12

|  | Example 6 | Example 22 | Example 23 | Example 24 | Example 25 | Example 26 |
|---|---|---|---|---|---|---|
| $CaCO_3$ (wt. % relative to A23) | 0 | 10 | 20 | 30 | 40 | 50 |
| Modulus at 100% strain (MPa) | 0.17 | 0.16 | 0.22 | 0.26 | 0.25 | 0.28 |
| Yield strength (MPa) | 0.40 | 0.48 | 0.65 | 0.73 | 1 | 1.3 |
| Elongation at break (%) | 350 | 490 | 430 | 460 | 590 | 725 |
| Shore 00 hrd. (±2) | 55 | 58 | 63 | 65 | 67 | 68 |
| Appearance | Smooth & transparent | Smooth Opaque white | Smooth Opaque white | Smooth Opaque white | Smooth Opaque white | Smooth Opaque white |

The addition of filler allows materials to be obtained having reinforced mechanical properties at J=1. By adding filler, it is therefore possible to provide materials having good mechanical properties without having to use a large amount of acid B.

Evaluation of Healing Properties

After mixing compounds A and B, the product was arranged on a plate surmounted by a Teflon-coated spacer of 4 mm thickness, and subjected to a temperature of 70° C. for 3 days. Test specimens were cut out with a punch and had a measured thickness of about 1 mm. A bevel cut was made in one part of the effective cross-sectional area of these test specimens and they were subjected to a self-healing cycle whereby the two pieces of each of the test specimens were placed end-to-end and the assembly subjected to a temperature of 70° C. for 48 h.

The self-healing properties were tested on materials of the invention obtained via reaction between an organopolysiloxane A23 or A22 and citric acid with a ratio of J=1, with and without the presence of filler.

In the present invention, healing is obtained via temperature (heating to 70° C. for 48 hours).

In the two examples below, it is shown that after healing most of the mechanical properties are restored.

TABLE 13

|  | Example 6 | Example 27 | Example 12 | Example 28 |
|---|---|---|---|---|
| Organopoly-siloxane A | A23 | A23 | A22 | A22 |
| Acid B | Citric | Citric | Citric | Citric |
| J | 1 | 1 | 1 | 1 |
| State | Initial | Self-healed | Initial | Self-healed |
| Modulus at 100% strain (MPa) | 0.17 ± 0.01 | 0.17 | 0.40 ± 0.1 | 0.26 |
| Yield strength (MPa) | 0.40 ± 0.03 | 0.26 | 0.7 ± 0.3 | 0.6 |
| Elongation at break (%) | 350 ± 40 | 170 | 320 ± 60 | 400 |
| Remark |  | Rupture at the cut |  | Rupture outside the cut |

Similar tests were conducted on materials obtained with citric acid, organopolysiloxane A22, J=1 and 10 weight % of quartz relative to the weight of A22. Healing again took place under heating at 70° C. for 48 hours. The rupture occurred outside the cut.

Recycling

The materials of the invention lose their mechanical properties when immersed in water at 70° C. for 7 days. This experiment therefore shows that the material can be recycled via this aqueous route.

On the contrary, the material of comparative example 6 (Organopolysiloxane comprising more than two alkoxy units) after 7 days at 70° C. maintains its initial shape. Water does not induce considerable loss of physical and mechanical properties to allow recycling of the material.

The invention claimed is:

1. A silicone material comprising a material obtained via reaction between:
   at least one organopolysiloxane A of mean molar mass (Mn) of less than 70000 g/mol, comprising siloxyl units (I.1) and (I.2):

$$Y_a Z^1_b \mathrm{SiO}_{\frac{4-(a+b)}{2}}; \quad (I.1)$$

$$Z^2_c \mathrm{SiO}_{\frac{4-c}{2}} \quad (I.2)$$

where:
a=1 or 2,
b=0, 1 or 2,
a+b=1, 2 or 3,
c=0, 1, 2 or 3,
the symbols Y, the same or different, represent a functional group of formula (I.3):

$$-\mathrm{E}-(\mathrm{NH}-\mathrm{G})_h-(\mathrm{NH}_2)_i \quad (I.3)$$

where:
h=0 or 1;
i=0 or 1;
h+i=1 or 2
E is an aliphatic, cycloaliphatic or aromatic divalent hydrocarbon radical having 1 to 30 carbon atoms;
if present, G is an aliphatic hydrocarbon radical having 1 to 10 carbon atoms, monovalent when i=0 or divalent when i=1;
$Z^1$, the same or different, is a monovalent hydrocarbon radical having 1 to 30 carbon atoms and optionally comprising one or more unsaturations and/or one or more fluorine atoms or a hydroxyl group;
$Z^2$, the same or different, is a monovalent hydrocarbon radical having 1 to 30 carbon atoms and optionally comprising one or more unsaturations and/or one or more fluorine atoms, a hydroxyl group, or radical —$OR^1$ where IV is a linear or branched $C_1$-$C_{10}$ hydrocarbon radical;
said organopolysiloxane A comprising per molecule:
   at least one siloxyl unit (I.1) carrying at least one functional group of formula (I.3);
   two units (I.2) for which at least one $Z^2$ is a radical —OW; and
   at least two terminal units M selected from the group composed of siloxyl units $Y_3\mathrm{SiO}_{1/2}$, $YZ^1_2\mathrm{SiO}_{1/2}$, $Y_2Z^1\mathrm{SiO}_{1/2}$ and $Z^2_3\mathrm{SiO}_{1/2}$; and
   at least one organic compound B carrying at least two carboxylic acid groups and having no unsaturation.

2. The material according to claim 1, wherein the organopolysiloxanes A comprise two terminal units (M) of formula $Z^2_3\mathrm{SiO}_{1/2}$ wherein in each of said terminal units, only one $Z^2$ is —$OR^1$.

3. The material according to claim 1, wherein the organopolysiloxanes A comprise at least two units (I.1) each carrying at least one group (I.3).

4. The material according to claim 1, wherein the ratio J representing the ratio between the number of moles of acid functions in compound B and the number of moles of amine functions in organopolysiloxane A $$J = \frac{\text{number of moles of compound } B \times \text{number of acid functions of compound } B}{\text{number of moles of compound } A \times \text{number of amine functions of compound } A}$$

is between 0.5 and 1.5.

5. The material according to claim 1, wherein compound B is selected from the group consisting of citric acid, malic acid, succinic acid, oxalic acid, malonic acid, succinic acid, tartaric acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid, phthalic acid, isophthalic acid, terephthalic acid, dipicolinic acid, trimesic acid, isocitric acid, oxalosuccinic acid, tricarballylic acid, homocitric acid, hydroxycitric acid, and pamoic acid.

6. The material according to claim 1, wherein organopolysiloxane A has an amount of NH bonding expressed in mol per gram of between $1·10^{-5}$ and $10·10^{-2}$ mol/g.

7. The material according to claim 1 further comprising a filler.

8. The material according to claim 7 comprising from 0.5 to 60 weight % of filler relative to the weight of organopolysiloxane A.

9. The material according to claim 1, wherein the reaction is implemented in the presence of an organic solvent S, the amount of organic solvent S is less than 30 weight % relative to the total weight of the mixture A+B+S.

10. A method for preparing the material according to claim 1, comprising:
   a) placing organopolysiloxane A in a vessel;
   b) if compound B is in solid form, it is dissolved in an organic solvent S;
   c) mixing compounds A and B or A and B and S;
   d) heating the mixture obtained in c) to a temperature of between 30 and 200° C.

11. The method according to claim 10 wherein organopolysiloxane A is not solubilised in a solvent.

12. The method according to claim 10, wherein the amount of solvent S used is less than 30 weight % relative to the total weight of mixture A+B+S.

13. A method for coating flexible substrates to produce airbags, conveyor belts, antibacterial coatings, dressings, or other materials coated with flexible substrates, comprising using the material according to claim 1 to coat flexible substrates.

14. A 3D printing method comprising the repeated application of layers of the material according to claim 1 to produce a 3 dimensional article.

15. A method for damp-proofing wood, concrete or stone by coating them with the material according to claim 1.

16. The material according to claim 7 wherein the filler is selected from the group consisting of quartz, silica, precipitated or pyrogenic silica, calcium carbonate, and mixtures thereof.

* * * * *